United States Patent [19]

Nielsen

[11] Patent Number: 4,714,419

[45] Date of Patent: Dec. 22, 1987

[54] CANDY DISPENSING APPARATUS

[76] Inventor: A. Lamont Nielsen, 2392 E. 2900 South, Salt Lake City, Utah 84109

[21] Appl. No.: 866,460

[22] Filed: May 21, 1986

Related U.S. Application Data

[63] Continuation-in-part of Ser. No. 595,322, Mar. 30, 1984, abandoned.

[51] Int. Cl.⁴ .................. B29C 41/22; B29C 41/42; B67D 5/00
[52] U.S. Cl. .................. 425/126 S; 221/292; 222/377; 222/385; 227/116; 227/156; 294/103.1; 294/119.1; 414/732; 414/736; 425/436 R; 901/32; 901/39
[58] Field of Search .................. 425/126 S, 436 R; 269/217, 234, 287; 222/377, 385; 221/290, 292; 294/103.1, 119.1; 414/732, 736; 901/32, 39; 227/2, 156, 116

[56] References Cited

U.S. PATENT DOCUMENTS

| | | | |
|---|---|---|---|
| 1,538,911 | 5/1925 | Taylor | 137/205 |
| 1,960,456 | 5/1934 | Robb | 53/122 |
| 2,006,376 | 7/1935 | Vogt | 53/122 |
| 2,232,273 | 2/1941 | Risser | 137/627.5 |
| 2,433,899 | 1/1948 | Granger | 269/287 |
| 2,703,666 | 3/1955 | Iannelli | 222/447 |
| 2,705,857 | 4/1955 | Fox et al. | 53/122 |
| 2,733,439 | 2/1956 | Pikal | 227/2 |
| 2,771,225 | 11/1956 | Perkins | 222/255 |
| 2,776,785 | 1/1957 | Lyon | 222/318 |
| 2,884,875 | 5/1959 | Rasmussen | 425/126 S |
| 2,893,275 | 7/1959 | Lindemann | 269/234 |
| 3,072,302 | 1/1963 | Giovannoni et al. | 222/442 |
| 3,168,225 | 2/1965 | Miller et al. | 222/380 |
| 3,213,903 | 10/1965 | Armstrong | 141/82 |
| 3,332,583 | 7/1967 | Lewis | 222/380 |
| 3,829,077 | 8/1974 | Strybel | 269/287 |
| 4,168,942 | 9/1979 | Firth | 141/82 |
| 4,249,392 | 2/1981 | Hotta | 62/457 |
| 4,288,009 | 9/1981 | Simmons | 222/442 |
| 4,323,174 | 4/1982 | Wood | 222/146.2 |
| 4,425,089 | 1/1984 | Billett et al. | 425/126 S |
| 4,548,573 | 10/1985 | Waldström | 425/126 S |
| 4,576,562 | 3/1986 | Anderson | 425/126 S |

FOREIGN PATENT DOCUMENTS 520344 6/1953 Belgium .
2814086 5/1979 Fed. Rep. of Germany .

Primary Examiner—Willard E. Hoag
Attorney, Agent, or Firm—Trask, Britt & Rossa

[57] ABSTRACT

A system for producing confectionary products, especially lollipops, is disclosed. The system includes a plurality of molds mounted on a conveyor belt assembly. A dispensing means adapted for injecting a predetermined quantity of fluid into each of the molds is positioned proximate the belt. A stick handle inserter for receiving a plurality of elongated sticks, and thereafter inserting a single handle into each of the fluid retaining molds, is positioned adjacent the belt either before or after the dispensing means. A cooling means for cooling the viscous fluid to aid in its solidification is associated with the belt. A transfer means positioned proximate the belt is adapted to remove the finished confectionary product from the mold and thereafter transfer that product to a station for wrapping.

10 Claims, 16 Drawing Figures

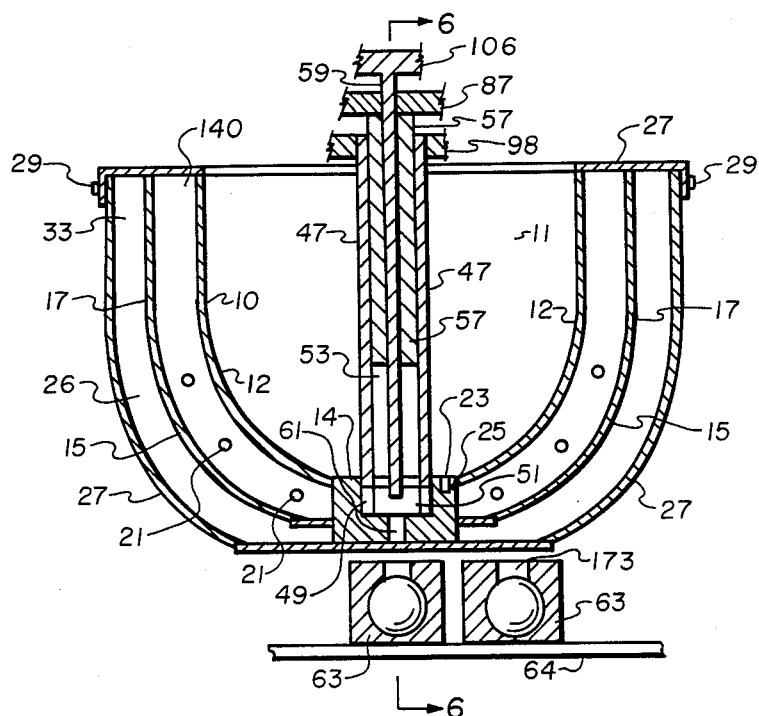
Fig. 5
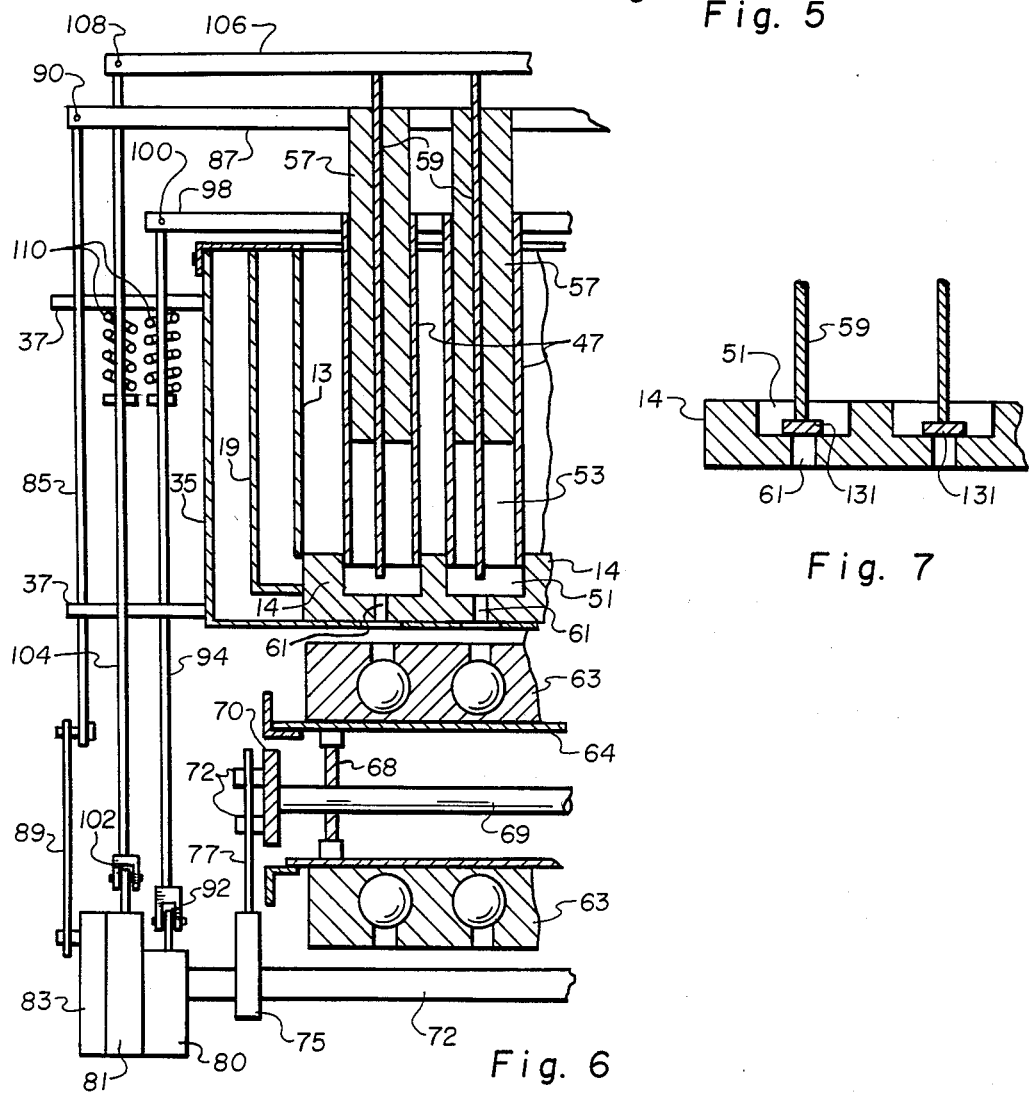
Fig. 7
Fig. 6

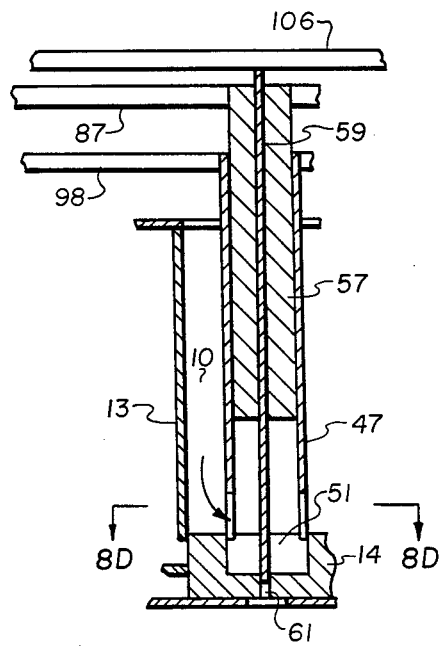
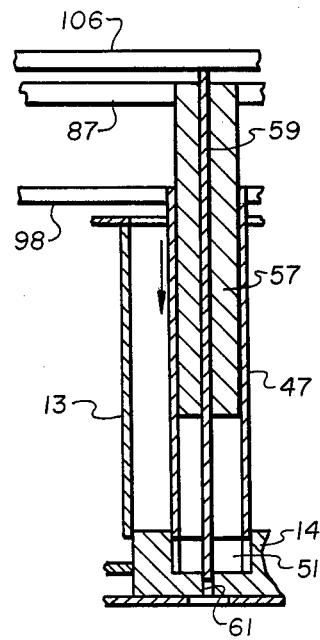
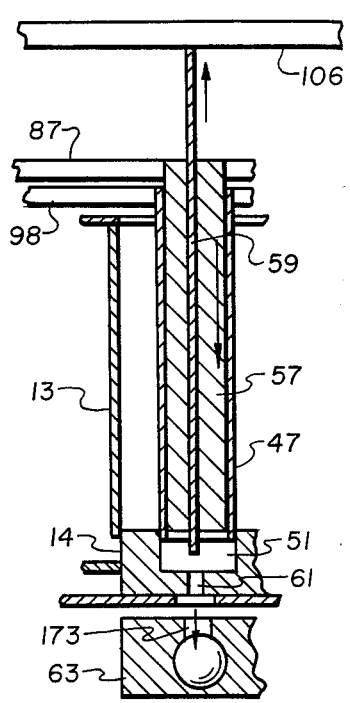
Fig. 8a  Fig. 8b  Fig. 8c
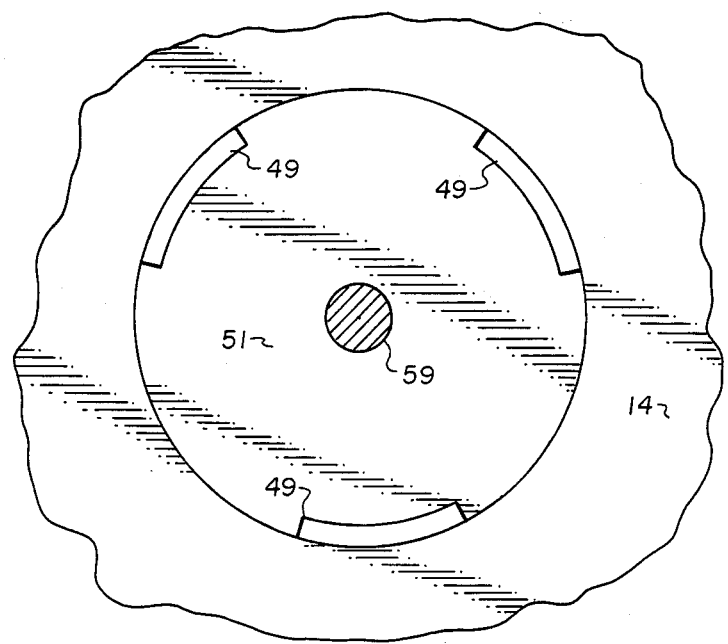
Fig. 8D

CANDY DISPENSING APPARATUS

RELATED APPLICATIONS

This application is a continuation-in-part of application Ser. No. 595,322, filed Mar. 10, 1984 now abandoned.

BACKGROUND OF THE INVENTION

1. Field

The instant invention relates to systems for producing confectionary products. More particularly, the invention is directed toward systems designed to produce lollipops. The invention incorporates three interrelated components. Specifically, these components include an apparatus for metering a specific quantity of viscous fluid or syrup into an awaiting mold, a device for automatically inserting a shaft-like stick or handle into the mold retained syrup, and a retraction apparatus adapted to remove the hardened syrup/handle product from its respective mold.

2. State of the Art

Fluid dispensing devices having means for measuring a specific quantity of fluid and additional means to discharge said fluid into a receptacle are well known. Typical devices include those incorporating an assemblage of valves, a dimensioned chamber for metering purposes and a discharging means. Categorization of such apparatus can be made by resort to the various means utilized to effect the various functions of the device; e.g., gravitational force, positive action, or a combination thereof. Recently developed apparatus have the capability of receiving liquid from a storage chamber, measuring a predetermined quantity of the liquid and then discharging the liquid into a receptacle. Such devices are typified by the ubiquitous commercial soft drink dispensing machine.

Representative container filling apparatus are those disclosed in the following U.S. Pat. Nos.: No. 2,232,273 (Risser); No. 2,703,66 (Iannelli); No. 3,168,225 (Miller, et al.); No. 2,776,785 (Lyon); No. 3,072,302 (Giovannoni, et al.); No. 4,288,099 (Simmons); and West German Pat. No. 2,814,086 (Stadler). These apparatus are typical of those which could find application in any operation where controlled quantities of liquids are utilized. An example might include use in a continuous manufacturing process. More specific examples would include the measured addition of chemicals to a quantity sensitive mixture, the dispensing of cookie dough onto cookie sheets, the filling of pre-formed molds to manufacture cast items, either comestible or otherwise, and the manufacture of paints and similar finishes.

Of the above-noted apparatus, each has advantages and disadvantages associated therewith. Risser, Iannelli and Giovannoni place reliance on gravity to accomplish the requisite transfer of fluid to the measuring chamber. The discharge is similarly gravity dependent. Such an approach to the problem of fluid handling inevitably restricts the range of application over which the device can perform effectively, this being due to the viscosity effects of the subject fluid. This problem is particularly acute in apparatus typified by Giovannoni and Risser wherein the intake and discharge valves are operated by an externally timed and actuated control mechanism. Such systems do not actually monitor the measuring chamber and hence fail to ensure that an exact amount of fluid is present in the measuring chamber before discharge. Rapid-filling, free-flowing, low viscosity fluids under the action of gravitational force may reliably fill a particular cavity or chamber; high viscosity fluids pose a different problem. In a manufacturing context, excessive time requirements may result from reliance on simple gravity-induced flow. This is true in that the requisite use of generalized calculations (to control the inlet and discharge functions) must include a time allowance for flow variations; e.g., those due to viscosity differences. This time allowance could defeat the device's amenability to rapid manufacturing processes. As a result, systems relying on a rapid outflow engendered by gravitational action on the fluid perform satisfactorily only with a low viscosity, non-tacky fluid.

Lyon and Miller attempt to remedy the defects of the gravity based system by use of the vacuum induced pressure differential created by the action of a piston-like member. The vacuum systems resultingly apply a positive action to draw the fluid into the chamber for measuring and then utilize the mechanical action of the piston to force the fluid through the discharge outlet.

The Lyon apparatus employs an intake valve mechanism that is actuated by vacuum pressure as well as the action of a calibrated spring. Of necessity, the calibrated spring is ineffectual in adjusting to the various densities of different fluids and the variation in pressures engendered by differences of fluid height above the valve. Moreover, the use of a spring inherently involves inaccuracies and mechanical deficiencies associated with temperature variation, fatigue and the like.

The Miller valve is dependent on forces transmitted through the fluid captive in the measuring chamber by the compressive action of the piston member. This assemblage is likewise dependent on fluid density. Given a fluid of low density, the compressive action of the piston could fail to produce sufficient pressure on the valve head and resultingly disturb the exacting dispersal of the fluid in a measured quantity.

In dispensing viscous syrups, such as those utilized in producing confectionary products, often a quantity of the syrup will remain in the apparatus after a production run. The removal of this remnant syrup is imperative. If permitted to remain in the dispenser, the remnant syrup tends to seed or cloud the new syrup which makes up the next production run. This seeding or clouding may affect the taste as well as the appearance of the products resulting from the next production run. To facilitate a proper removal of this remnant syrup, a disperser should be free of internal pockets and crevices within the dispensing chamber, and furthermore, susceptible to easy disassembly to permit exposure, cleaning and inspection of all surfaces which contact the viscous fluids being used. Many of the conventional dispensing apparatus are either sealed or alternately of sufficient structural complexity that disassembly for cleaning purposes is either difficult, impractical or susceptible to putting the apparatus out of adjustment. In this context, it must be remembered that many hot sugar syrups solidify or crystallize at temperatures above the boiling point of water. As a result, flushing the apparatus with heated water as a means of removing remnant syrup is not an available alternative. There remains, therefore, a need for a dispensing apparatus which at once is suitably adapted for positive action dispensing of a preselected quantity of viscous fluid while simultaneously being configured to be easily disassembled to expose all surfaces which contact the fluid for purposes of cleaning those surfaces. Furthermore, the dispenser should be amenable to easy reassembly without disturbing the adjustments of the apparatus.

SUMMARY OF THE INVENTION

The instant invention discloses an integrated system for dispensing a preselected quantity of viscous fluid, e.g., a confectionary syrup into a conveyor borne mold, subsequently positioning a shaft-like stick handle into the mold retained fluid, and then cooling the fluid. A retractor device, adapted to seize the stick handle and thereafter remove the cooled product from an opened mold, is positioned proximate the conveyor for purposes of transferring the product to a wrapping station.

More specifically, the invention includes a driven conveyor belt having positioned thereon a plurality of separable molds. These molds are positionable in two distinct conditions; a first or closed condition wherein the mold presents an access port for receiving a fluid and directing that fluid to an otherwise fluid-tight casting chamber. A second or open condition wherein that mold is opened permitting the hardened fluid to be retracted or otherwise removed form the casting chamber. The conveyor is driven to convey the molds in an ordered progression between three distinct and identifiable stations. Subsequent to the completion of that conveyance, the conveyor is adapted to repeat the same progression in a repetitive fashion. Those three stations, as set forth above, include injection of fluid, insertion of stick handle and retraction of finished product from the mold. Between the injection of fluid and the retraction of the finished product, the belt passes through a cooling environment, such as a cooling chamber which operates to cool the heated fluid and thereby produce a hardened finished product. The belt is integrated into a system drive mechanism which permits the dispenser stick inserter and finished product retractor to coordinate their various functions with the mold positioned on the conveyor belt.

The fluid dispenser of the instant invention seeks to provide a fluid, e.g., a liquid, and especially a syrup, dispensing apparatus which incorporates a positive action means to induce the subject fluid's entrance into the apparatus, a means to accurately measure a predetermined quantity of the fluid and a means to effect a positive action discharge of it.

Furthermore, the dispensing apparatus renders its dispensing function substantially independent of the viscosity, tackiness and density of the fluid being dispensed. Additionally, the invention seeks to provide a device qualified to function effectively over a wide range of fluid types irrespective of fluid temperature.

The dispenser includes a solid walled, hollow measuring tube having an interior chamber with an adjustable volume suitable to accommodate a predetermined amount of fluid. This adjustability in volume is facilitated by a variable displacement piston positioned to reciprocate within the chamber. The piston end surface defines an end wall of the chamber. The chamber is accessible through an inlet port positioned on an end of the measuring tube. Entrance of fluid into the measuring tube results from the use of both gravitationally induced flow as well as through positive action means.

The measuring tube is positioned within a supply chamber containing a quantity of fluid to be dispensed. The access port of the measuring tube is positioned below the level of the fluid. Initially, that end of the measuring tube which includes the access port is held in abutment against the wall of the supply chamber effectually sealing the access port. Further, the interior piston may be positioned within the chamber proximate the access port. Upon the measuring tube being moved away from the supply chamber wall, the access port communicates with the fluid within the supply chamber. Further, the piston is displaced sufficiently within the measuring tube chamber to define a measuring chamber, within the measuring tube, having a preselected volume. Since the piston sealedly engages the interior walls of the measuring tube chamber, the displacement of the piston within the chamber induces a vacuum within that portion of the chamber extant between the access port and the end wall of the piston, i.e., the metering chamber. This vacuum creates a positive action-induced flow of fluid through the access port into the measuring tube chamber.

Upon displacing the piston into the measuring tube chamber, the apparatus functions to draw the fluid into the measuring tube chamber through the access port by a means employing both gravitational force and the pressure differential of a partial vacuum. The metering chamber, adjusted to a particular volumetric displacement, is completely filled by the fluid to provide a predetermined quantity of fluid for discharge. The measuring tube is then returned to its abutment position against the supply chamber wall, thereby closing the access port and sealing the metering chamber.

A discharge port, defined by the measuring tube which communicates with the metering chamber, is then opened. The piston is then returned to its original position proximate the end of the measuring tube. Due to the displacement of the piston, the fluid is forcefully ejected from the metering chamber into an awaiting receptacle or mold. The discharge function is rendered by positive mechanical action means.

The instant invention, in a more structurally definitive embodiment, relates to a measuring tube having an elongated interior channel which includes an open upper end and a circular discharge opening in the bottom thereof. The measuring tube is supported in the bottom of a large supply chamber by an actuation means adapted to reciprocate the measuring tube between an abutting and non-abutting relationship with the supply chamber wall. A piston is sealingly fitted into the channel in a manner to facilitate an axially reciprocating motion by the piston within that channel. The piston itself includes a head having an aperture therein, and a slidable shaft which extends through that aperture.

The piston is also connected to a respective actuation means which reciprocates the piston between a first condition wherein the head of the piston is brought into close proximity with the open end of the measuring tube and a second condition wherein the piston is displaced into the channel. The shaft extending through the piston head aperture likewise is controlled and axially displaced by a respective actuation means.

As the measuring tube is displaced away from the wall of the supply chamber, the open end of the measuring tube communicates with the fluid resident in that supply chamber. The displacement of the measuring tube from the chamber wall creates a void which is filled by the fluid initially surrounding the measuring tube. As the measuring tube is displaced, the piston under the action of its actuation means is displaced into the measuring tube channel thereby creating a vacuum within that portion of the measuring tube channel defined by the interior measuring tube walls forming the channel, the head of the piston and the open end of the channel. This portion of the measuring tube channel will be designated as the metering chamber. The joint action of the actuation means, which control the action of the measuring tube and the piston, operate to produce a measuring tube/piston orientation in which the piston head is positioned at a maximum distance from the open end of the channel. This orientation is adjusted to define a preselected metering chamber volume. It is the volume which defines substantially the quantity of fluid to be dispensed by the apparatus. During this measuring tube/piston displacement, the shaft extending through the piston head is held motionless. This shaft extends through the channel, including its open end, to be received within and seal a discharge port defined within the wall of the supply chamber proximate the portion of that chamber which abuts against the measuring tube when the measuring tube is in its abutting relationship with the supply chamber.

Upon the metering chamber being filled with fluid, the measuring tube is directed to its sealed abutment against the supply chamber wall by its respective actuation means. The piston is displaced commensurate with the displacement of the measuring tube, i.e., the piston remains motionless with respect to the measuring tube. Upon the measuring tube coming into a sealed engagement against the supply chamber wall, the piston is driven by its actuation means toward the open end of the measuring tube. The piston shaft, which formerly sealed the discharge port, is then retracted from its sealing relationship with the discharge port under the action of its respective actuation means. The motion of the piston operates to discharge the fluid residing in the metering chamber through the discharge port and into an awaiting mold or receptacle positioned proximate that port. The piston shaft is then returned to its sealing position within the discharge port and the process sequence is repeated.

The molds utilized in this invention include an injection port for receiving a stick handle. This handle is positioned partially within the mold retained fluid sufficient that upon cooling, the fluid forms a bond of sufficient strength to permit a user to manipulate the confectionary by means of the stick for purposes of eating same.

The stick inserter functions to remove an individual stick from a bin containing a supply of sticks and thereafter position that stick in alignment with the stick opening in the mold. The inserter includes a tampering means which impacts against the stick and drives it securely into the opening and into the fluid within the mold. Structurally, the inserter includes an open-ended bin configured generally to facilitate the substantially horizontal storage of a plurality of elongated sticks. The planar floor of the bin is adapted to be slidable in the plans thereof. The floor contains a slot-like recess which in dimension is slightly larger than one of the sticks. The recess is orientated substantially parallel to the placement or orientation of the sticks whereby as the floor slides in its plane, inevitably one of the sticks arranged above it falls into the recess. The recess passes completely through the floor.

The floor panel is positioned on top of a second panel which itself contains a slot which passes completely through its thickness. The slot in the second panel is fixedly positioned so as not to be immediately below the storage bin, i.e., it is positioned to the side of the portion of the bin containing the sticks. Upon the movement of the floor panel so as to align the two slots, the stick passes through the sub-floor into a sub-chamber. The stick generally enters the sub-chamber, which is positioned generally above the fluid containing molds in a substantially horizontal orientation. Proper placement of the stick in the mold is a substantially vertical orientation. The translation of the stick from its horizontal to a substantially vertical orientation is accomplished in the sub-chamber. The sub-chamber includes a curved vertical bank member. The member is positioned such that one end of the stick initially impacts against the bank, while the opposing end continues to fall without impediment. The bank is configured such that as the stick continues its downward descent, the interfacial contact area between the stick and the bank is displaced from the point of initial contact, i.e., the one end along the length of the stick until it almost reaches the opposing end. Due to the curved configuration of the bank, this contact between the bank and the stick functions to position the stick in a substantially vertical upright positioning in the lower reaches of the sub-chamber. A vertically positioned tampering shaft, arranged to be axially reciprocable, is held in position above the position wherein the stick eventually comes to rest. Upon the fluid containing mold being brought into proper alignment below the inserter, a discharge port positioned below the vertically retained stick is opened and the tampering shaft is directed downward against the stick, impacting against it and driving into the access port of the mold. Subsequently, the inserter discharge port is closed and the floor panel slides back to its initial positioning thereby loading a second stick into its recess slot. The sequence is then repeated for a subsequent mold being brought into alignment below the inserter.

The cooling environment may consist of a plurality of cooling coils, as conventionally used in refrigeration units. The coils may be associated with a plurality of fans oriented to direct air over the coils and then over the surface of the molds. The coolig chamber is dimensioned such that upon the mold reaching the end of the belt, the fluid within the mold is sufficiently solidified that the mold can be opened and the solid product, together with the stick, may be removed integrally from the mold. This removal is effected by a retractor device which includes an arrangement of three or more planar panels positioned parallel one another and substantially contiguous one another. A central panel contains a plurality of substantially "V"-shaped slots which are positioned at spaced intervals along the length of the panel. The slots may be received in the apex of the slot. A secondary panel is positioned on opposing sides of the central panel. These secondary panels each include a plurality of "J" or "L"-shaped or hook-shaped slots which are positioned at spaced intervals along the length of the secondary panels so as to substantially correspond to the spacings of the "V"-shaped slots in the central panels. The slots of the two secondary panels are aligned one with another. The hook portion of the "J" or "L"-shaped slots are positioned adjacent the apex of the "V"-shaped slots. When a stick is inserted into the "V"-shaped slot, the secondary panels slide laterally along the surface of the central panel whereby the hook portion of the secondary panels secure the stick within the apex of the "V"-shaped slot. The secondary panels bias the stick sufficiently against the structure of the central panel that the stick may be maneuvered about. The retraction, having seized the stick, is associated with a transferred means adapted to shift the stick together with its associated confectionary product to a wrapping station.

BRIEF DESCRIPTION OF THE DRAWINGS

FIG. 5 is a side cross-sectional view of a fluid dispenser for use in the process system of the invention;

FIG. 6 is an end elevational view of the dispenser shown in FIG. 5 in association with the drive actuation means of that dispenser;

FIG. 7 is a side cross-sectional view of the discharge port and associated shaft plug of a dispenser of this invention;

FIG. 8A is a side elevational view shown in cross-section of a dispenser illustrating the dispenser measuring tube a piston in a displaced positioning;

FIG. 8B is a side elevational cross-sectional view similar to FIG. 8A showing the dispenser measuring tube in a closed abutting relationship with the supply chamber sidewall;

FIG. 8C is a side elevational cross-sectional view similar to FIG. 8A showing the discharge port open and the piston in a downwardly discharging configuration;

FIG. 8D is a cross-sectional view of the dispenser shown in FIG. 8A taken along section lines 8D—8D.

DESCRIPTION OF THE ILLUSTRATED EMBODIMENT

Figure 1:
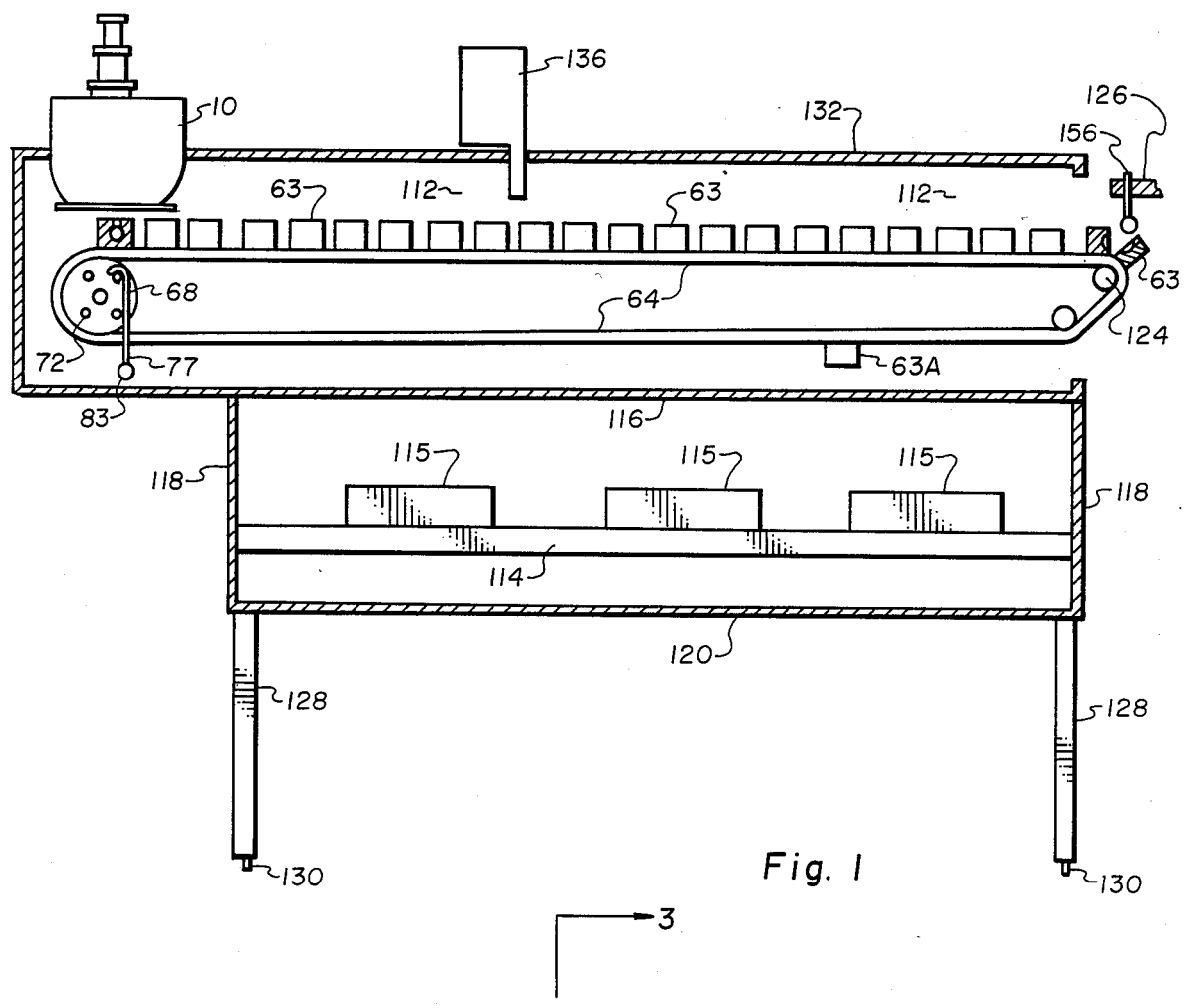
FIG. 1 is a side elevational view of the confection process system of the instant invention showing the anticipated locations of the various components thereof.
Figure 2:
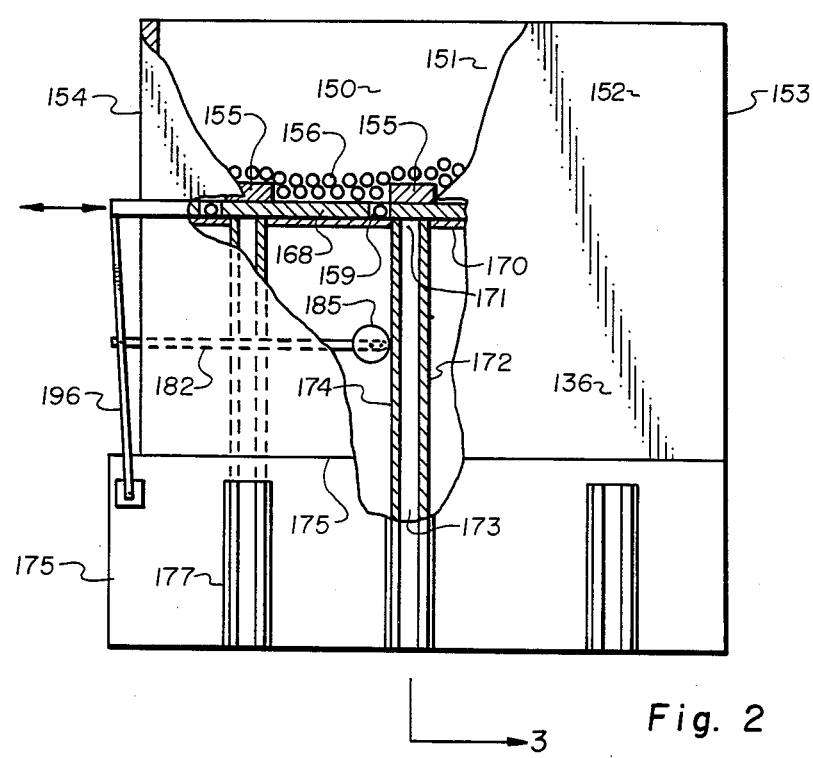
FIG. 2 is a side view with a partial cut-away section of the stick inserter of the instant invention.
Figure 2A:
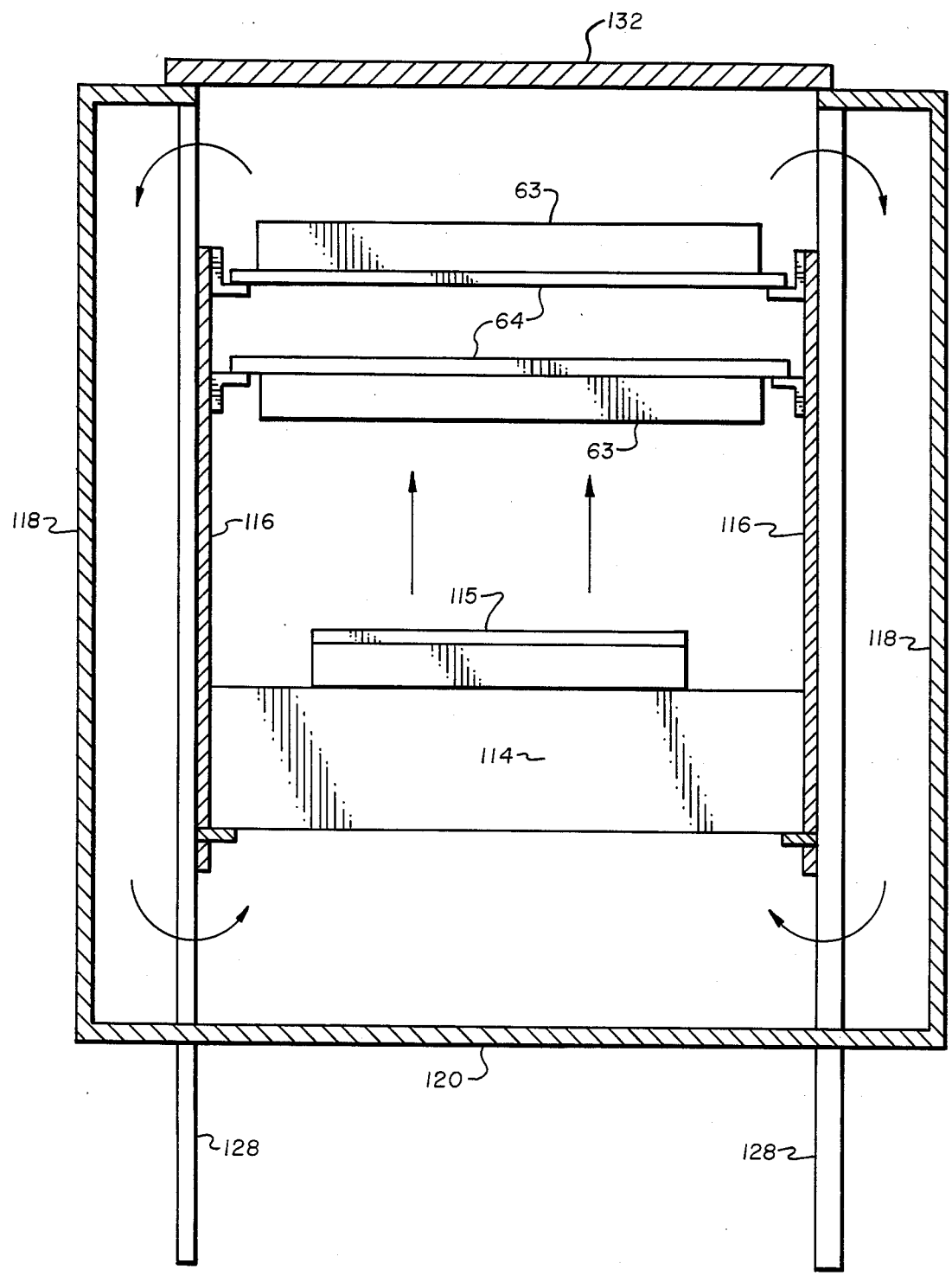
FIG. 2A is an end view of the conveyor belt cooling assembly.
Figure 3:
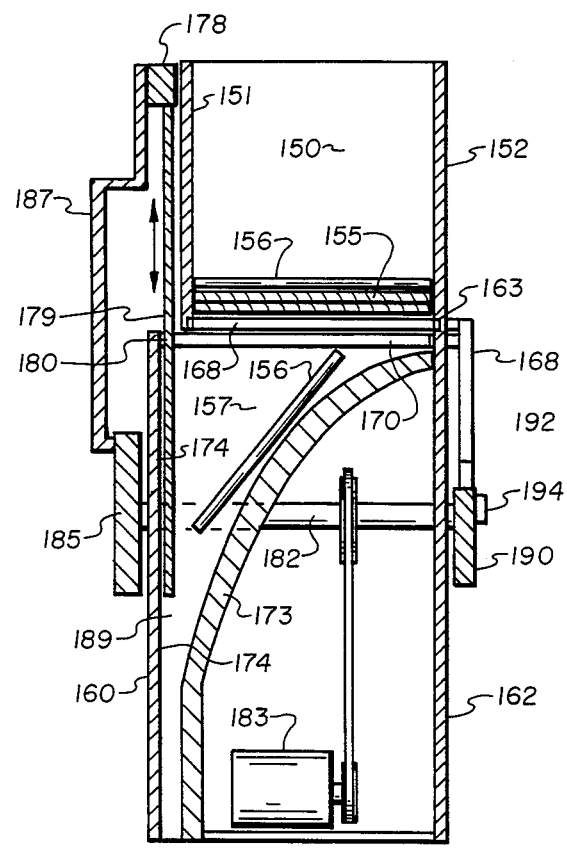
FIG. 3 is a cross-sectional end view of the inserter shown in FIG. 2 taken along section lines 3—3.

The embodiment described will be for the production of confectionary products such as lollipops. The embodiment is further clarified by reference to the attached FIGS. 1 through 8D. Supply compartment 10 is provided to receive and temporarily store sugar syrup. Typically, this syrup is held at about 300° F. Compartment 10 is formed by curved sidewalls 12 and end walls 13 converging with bottom discharge plate 14. In cases where the fluid needs temperature control, the supply compartment 10 is surrounded by a liquid-tight compartment 15 which is formed by curved walls 17 and flat end walls 19 converging with discharge plate 14. Within compartment 15 are heaters 21 mounted through end walls 19. These heaters may be electric cartridge heaters or the like, as known in the art, controlled by a thermostat (not shown) with an associated thermocouple 23 in well 25 in discharge plate 14. Insulating compartment 26 is formed by removable cover 27 which is attached by screws 29 and filled with insulating material such as glass wool 33. Projecting from the sides of end plates 35 are push rod guides 37.

A thin-walled tube 47, with guide prongs 49 projecting from the bottom, is fitted into shallow cups 51 which are milled at spaced intervals in the top of discharge plate 14. Each cup 51 is fitted over tube 47 with a tight slide fit. Tube 47 serves as a measuring tube or chamber 53. Referring to FIGS. 5 and 6, when tube 47 is down, it projects slightly into cup 51 and seals the measuring chamber 53 from communicating with supply compartment 11. When tube 47 is raised, free communication between measuring chamber 53 and supply compartment 11 through spaces between guide prongs 49 is established. Piston 57 is fitted into tube 47 with a snug slide fit. Piston 57 has a small round hole through its concentric longitudinal center into which discharge valve 59 is fit with a snug slide fit. When the discharge valve 59 is down, its bottom end projects slightly into discharge hole 61 which is drilled through the bottom of cup 51 and effectively stops communication between chamber 53 through discharge hole 61 to molds 63. When discharge valve 59 is raised, communication between measuring chamber 52 through discharge hole 61 is established.

A series of split aluminum molds 63 are mounted on roller chains 64 in a closed loop in such manner that successive molds 63 are indexed under discharge holes 61 (see FIG. 5). Roller chains 64 are mounted on sprocket 68 which is mounted on drive shaft 69. Mounted on the end of shaft 69 is an indexing plate 70 with indexing pins 72 projecting outward in a concentric circle from indexing plate 70. Motor driven shaft 72 is mounted below and parallel to shaft 69. On shaft 72 is mounted eccentric drive 75 with hook arm 77 extending upward to engage with pins 72 in such a manner that when shaft 72 is rotated, eccentric drive 79 raises hook arm 77 to engage a pin 72 and as shaft 72 continues to turn, arm 77 is lowered and indexes a succeeding mold underneath discharge hole 61.

On the ends of shaft 72 are mounted cam 80 and cam 81. Cam 80 raises and lowers measuring tube 47 in a manner determined by the shape of cam 80. Cam 81 raises and lowers discharge valves 59 in a manner determined by its shape.

Also mounted on drive shaft 72 is eccentric drive 83 with offset drive bar 89 for driving piston 57 in a vertical up and down simple harmonic motion. All of the pistons 57 are mounted on piston lift bar 87. Eccentric bar 85 attaches to lift rod 89 which is fastened to piston lift bar 87 by pin 90. Cam follower 92 is attached to push rod 94 and push rod 94 is attached to intake lift bar 98 by pins 100. In a like manner, cam follower 103 attaches to push rod 104. Push rod 104 is attached to discharge valve lift bar 106 by pin 108. Compression springs 110 hold cam followers 92 and 102 in contact with cams 80 and 81. As shaft 72 is rotated, pistons 52 are driven up and down in measuring tube 47. As piston 57 is rising, tube 47 is held in its up position and discharge valve 59 is held in its down position and syrup is drawn into the measuring chamber 47 between prongs 49. As piston 57 is lowered, tube 47 is in its lowered position and discharge valve is held in its raised position and the syrup in measuring chamber 47 is discharged through discharge holes 61 (see FIGS. 8B and 8C). As filled molds 63 are indexed forward through cooling chamber 112, the filled molds 63 are cooled by a cold air blast from refrigeration coil 114. The cold air chamber is formed by baffle 116, sides 118, bottom 120 and removable top 132. From the refrigeration coil 114, which is located under the baffle 116, the cold air is circulated by fans 115 around and between the filled molds 63A and the returning empty molds 26 and then returned to the refrigeration coil 114. In this air circuit, very little outside air is taken into the cooling chamber which results in very little condensation of moisture on the molds as they are circulated in the closed circuit. Where moisture is condensed on the returning empty molds, there is a tendency for the succeeding syrup to stick in the molds. As the filled molds are indexed around the small roll 124 at the far end of the loop, the molds are opened and the cooled lollipops are picked up by the transfer clamp 126 and fed into a wrapper assembly (not shown). The unit is supported by legs 128 with leveling screws 130. In order to have the best results, it is important that the relation between the size of pistons 57 and valves 47 and 59 be maintained. It is important that the area of the intake path from the supply chamber 10 to the measuring chamber 47 be at least as large as the area of the bottom of piston 57. The optimum relation of the size of the valves relative to the piston diameter is indicated by FIGS. 5 through 8A. Under these conditions, there will be a rapid and uniform flow of syrup from the supply chamber 10 to the measuring chamber 47. For very viscous fluids, length of prongs 49 and the depth of cup 51 may be increased and the tube 47 travel increased to give larger intake area.

If a flat surface a plug 131 is used for sealing, as shown in FIG. 7, the valves 59 being all attached to a common lift bar 106. The valves 59 must be of the exact same length to make a seal. With the valve projecting into the discharge hole 61, as shown in FIG. 8A, the seals may be made even with different length valves 59. In using flat surface plugs 131, operating experience has shown this "same valve length requirement" to be vital for light viscosity fluids. Even a few thousands of an inch difference in valve length can cause leaks. In the instant invention, the shaft valves 59 project into the discharge holes 61 and make a plug seal such that the valves 59 still seal even though their length may be different. In most conventional gang-mounted valves, valve springs are used and are operated by tappets to insure against leaking. Referring again to FIGS. 5 through 8C, the discharge valves 59 can be lifted out vertically by removing pins 108 and the tube 47 can be lifted out vertically by removing pins 100. The surfaces which contact the syrup are smooth and exposed for inspection and spot cleaning, if necessary. The pistons and valves can be quickly reassembled by following a reverse procedure. In operation, this feature will save much time in cleaning. The adjustments remain unchanged.

Referring to FIG. 1, at a place in the cooling compartment where the syrup in the molds 63 is partially cooled, the sticks are placed in the cooling molds by a stick setter 136. This stick setter 136 will be described hereinafter.

In some instances, the viscous fluid may not need to be cooled if such conventional cooling is applied in chamber 140 in place of the heaters. In some instances, it is desirable to cover the top of the supply hopper compartment with removable covers.

The stick setter to dispense sticks into lollipops consists of a compartment 150 which is formed by sidewalls 151 and 153 and end walls 154. In the bottom of compartment 150 are cap bars 155 which divide the bottom into equal discharge areas. These bars may be about four times the diameter of the sticks 156 in width and about three times the stick diameter in height. A discharge chamber 157 is formed by the extension of end walls 154 downward, and walls 160 and 162 which are located below walls 151 and 152. Walls 160 and 162 may be about one stick 156 length in height and are separated from the bottom of walls 151 and 152 by slightly more than the diameter of stick 156. Slots 163 are milled in end walls 153 and 154 slightly more than the diameter of stick 116 in depth and as wide as the distance between the outside of walls 151 and 152. The width of the compartment 150 is dimensioned to be slightly more than the length of one stick 156. This permits sticks 156 to be stacked in compartment 150, parallel to ends 153 and 154. The top of slots 163 are to be flush with the bottom of walls 151 and 152. A selector plate 168 is fitted into slots 163 with a snug slide fit and extends beyond walls 153 and 154 slightly more than the distance between cap bars 155. Slots 159 are milled in selector plate 168 directly under the center of each cap bar 155 with the length of these slots extending slightly under sidewalls 151 and 152 and a sufficient width to give a free space for one stick in the slot 159. Directly under selector plate 168 is a discharge plate 170 attached to and flush with the top of walls 160 and 162. In discharge plate 170, slots 171 having a width of two sticks 156 are milled under the center of caps 155. The length of slots 171 is dimensioned to be slightly more than the length of slots 159. In discharge chamber 157, and under each slot 171, are discharge slides 172 formed by curved slide bed 173 and sides 174. Slide bed 173 includes a width sufficient to allow the free slide of a stick 156 falling onto the slide bed 173. The bottom end of slide bed 173 is vertical and set back slightly more than one stick diameter from the edge of end walls 153 and 154. The sides 174 are to be flush with the sidewalls 152 and 154. A gate 175 is located below wall 163 and extends through slots 176 in sidewalls 153 and 154. Slots 177, with open bottoms, are milled in front of each vertical slide bed 173. A push bar 178 with push rods 179 is mounted in the holes 180 in discharge plate 170. With push bar 178 against the top of discharge plate 170, the push rods 179 should extend downward about one inch past the top of slots 177 behind gate 175.

Extending through walls 160 and 162 is a shaft 182 which is driven by brake motor 183. On the end of shaft 183, under push bar 178, is an eccentric drive 185 with connecting rod 187 pivoted from the offset point on eccentric drive 185 to push bar 178 in a manner that when shaft 182 is rotated one turn, push rods 179 are driven down and up in the vertical discharge space 189. On the other end of shaft 142 is mounted a second eccentric drive 190 with connecting rod 192 pivotely mounted on offset point 194 and extending to selector plate 168 in such a manner that when shaft 182 is rotated one revolution, selector plate 168 is driven back and forth in slots 163 and moves the slots 159 in selector plate 168 across the bottom of discharge areas in supply compartment 150. Conneccting bar 196, having a slotted end, connects selector plate 168 to gate 175 in such a manner that as slot 159 is selector plate 168 is moved under cap bars 155, the slots 163 are moved away from vertical slide space 172 and as selector plates move slots 159 from under cap bars 155, the slots 177 are in line with the vertical slide area 189.

Since the controls are locked together in the instance system and operated from one motor, the sequence is assured. In the stopped position, the gage 175 is open, the selector plate 168 is loaded with a stick 156 in each slot, and the tamper 178 is up. As the filled mold 63, with sticks inserted, is indexed forward and a filled mold, without a stick, is indexed under the stick setter 150, a signal from rotating shaft 72 starts motor 183 and starts the stick setter movement. The gate 175 closes, followed by selector plate 168 dropping sticks into discharge slides 172. The stick falls into the bottom of slide 172 and the tamper 178 moves down to push the sticks into the lollipops through inlet port 173 of mold 63. The tamper 178 then rises. The gate 175 then opens, followed by a repeat in continuous succession.

There is a possibility, which does not occur often, that a bent stick may enter the slide 172 and cause a jam. To cope with this happening, it is well to make the flat parts of a clear plastic, such as that sold under the trademark LEXON, through which the sticks can be seen at all times. The gate 112 is installed so it can be made free by removing one small bolt and then sliding the gate out and exposing the stick slide 172 so that the bent stick can be removed manually and the gate 175 replaced in a few seconds.

The transfer or retractor clamp 200 consists of three blades 202 stacked together. Pressurized air cylinders operate to clamp the blades on the sticks of the lollipops as they are discharged by the opening of the molds 63 at the end of the closed loop. The lollipops are pushed forward and dropped in an upright position on a conveyor which feeds a wrapping machine. This gives a positive force to remove the lollipops from the open mold 63 and assures that none of the lollipops will be carried back to the filling station and cause a jam.

Figure 4:
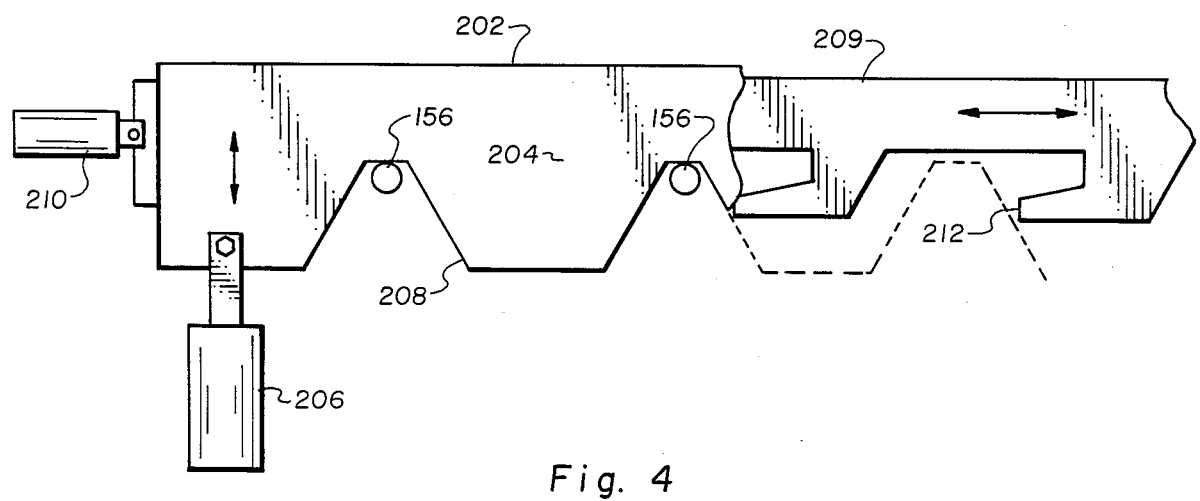
FIG. 4 is a partial top view with a partial cut-away of the sliding slotted panels of the retractor of this invention.
Figure 4A:
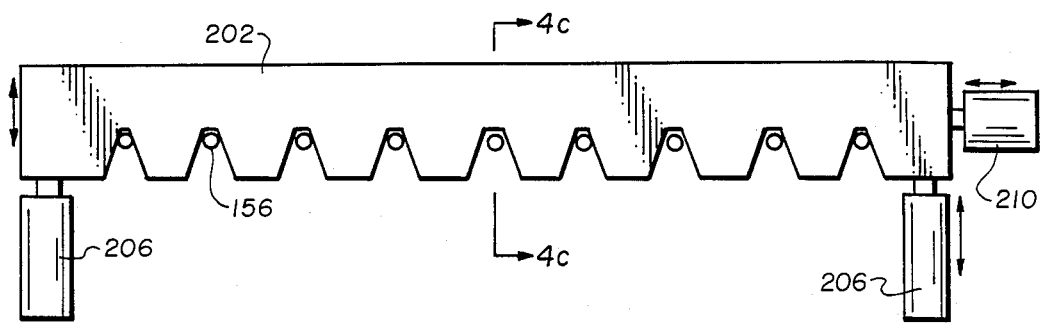
FIG. 4A is a top view of the sliding slotted panels of the retractor.
Figure 4B:
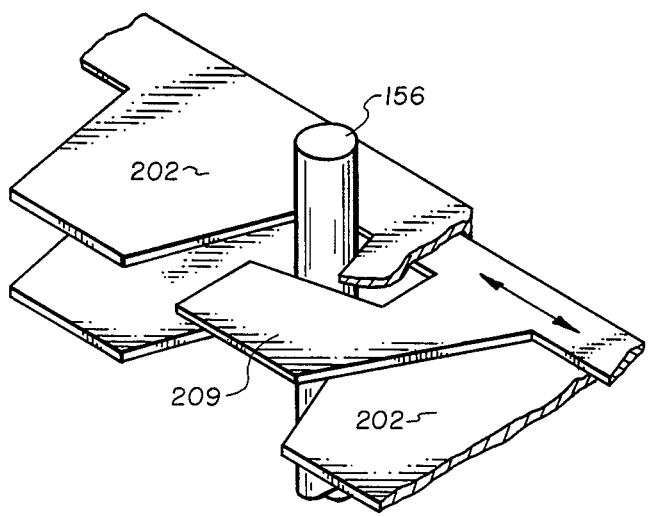
FIG. 4B is a multiple cut-away top view of the sliding panels shown in FIG. 4A.
Figure 4C:
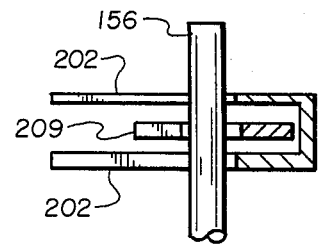
FIG. 4C is a cross-sectional view of the slotted panels shown in FIG. 4A taken along sectional lines 4C—4C.
Figure 4D:
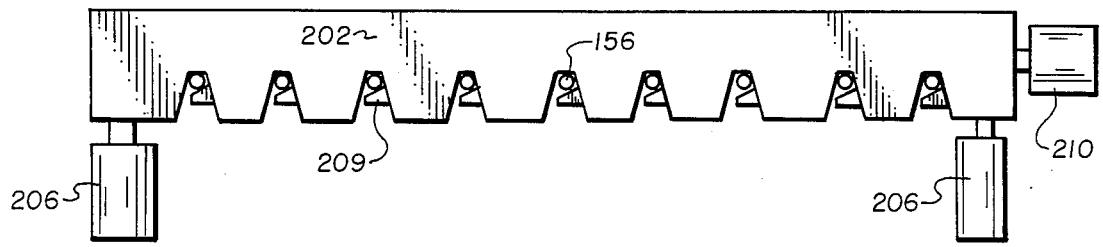
FIG. 4D is a top view of the sliding slotted panels of the retractor shown in a stick grasping condition.

The construction of the clamp is illustrated by the accompanying FIG. 4.

The transfer clamp consists of a top and bottom identical blades 204 which are attached to two air cylinders 206. A cylinder 206 is mounted at each end such that when air is applied to the cylinders 200a, the blades will move forward and away from the opened mold 26. In the two blades 204 are a series of notches 208 spaced to match the position of the sticks. A second blade 209 is movably mounted between the blades 204 and attached to a third air cylinder 210 such that blade 209 can be moved sideways between blades 204. Blade 209 has "L"-shaped hook notches 212 which match the notches 208 in blades 204. Each notch 212 defines an elongate inlet channel and a retention channel. These channels are formed by a respective linear segment of each "L"-shaped notch.

When the blade 209 is in the retrieved position, the notches in blades 204 are open, and when the blade 208 is in the forward position, the hook notches in blade 204 are closed by the hooked notches on blade 209 to hold the sticks. When the blades are in their extended position away from the molds, the blade 209 is retracted and the sticks are released and dropped.

Those skilled in the art will recognize that the embodiments hereinbefore discussed are illustrative of the general principals of the invention. The embodiments herein described are not intended to limit the scope of the claims, which themselves recite what applicant regards as his invention.

I claim:

1. A transfer clamp for use in removing articles from a conveyor belt, said clamp comprising:
   at least one first elongate panel, having a longitudinal axis, defining at least one substantially "V"-shaped slot spacedly positioned along one side of said first panel, said "V"-shaped slot having an interior region dimensioned to receive a stick portion of a lollipop mold assembly;
   at least one second elongate panel positioned parallel and adjacent said first panel, said second panel defining at least one substantially "L"-shaped slot spacedly positioned along one side of said second panel to register with the positioning of said "V"-shaped slot, said "L"-shaped slot having an elongate inlet channel and a retention channel;
   a first drive means associated with said second panel for displacing said second panel along said first panel between two conditions, a first condition wherein an interior region of said "V"-shaped slot is aligned with said inlet channel of said "L"-shaped slot, whereby a stick may be inserted into said aligned slots, and a second condition wherein said interior region of said "V"-shaped slot is not aligned with said inlet channel of said "L"-shaped slot, wherein said retention channel of said "L"-shaped slot in association with said interior region of said "V"-shaped slot substantially encircle of stick inserted into said "V"-shaped slot.

2. The transfer clamp of claim 1 wherein a second panel is positioned on opposing sides of said first panel, said first panel is positioned between a pair of said second panels.

3. The transfer clamp of claim 1 wherein a displacement of an edge of said "L"-shaped slot is adapted to bias said stick against an edge of said "V"-shaped slot with sufficient force to retain said stick during a manipulation of said panels.

4. The apparatus of claim 3 with the addition of a plurality of molds and conveyor means for moving said molds, to and away from means for dispensing a confection material into said molds.

5. A stick handle inserter for use in positioning stick handles in confectionary products, said handle inserter comprising:
   a storage bin dimensioned to retain a plurality of substantially horizontally positioned stick handles, said bin having a floor which is mounted laterally slidable, said bin floor having at least one slot therein aligned parallel with said positioning of said stick handles in said bin, said slot being dimensioned to receive at least one of said stick handles;
   at least one upright chute positioned below said bin floor, said chute having an open end positioned contiguous said bin floor, said open end dimensioned to receive said bin floor slot retained stick handle from said bin floor slot upon said open end and said slot being brought into alignment;
   at least one bar member positioned vertically above said chute open end said bar member being positioned atop and substantially contiguous said bin floor whereby said bar member precludes stick handles other than said stick handle in said bin floor slot from accessing said chute open end;
   an upright curved bank mounted within said chute, said bank having a point of maximum elevation and a point of minimum elevation, said maximum point being positioned substantially directly below a first end of said stick handle and said minimum point positioned substantially directly below an opposite end of said stick handle;
   whereby a stick handle falling into said chute contacts said chute initially proximate said first end and a surface of contact between said stick handle and said chute is displaced along a length of said stick handle as said handle continues its descent in said chute, whereby said stick, upon reaching a bottom of said chute, is oriented in a substantially vertical positioning;

a tamper means for impacting against said vertically positioned stick handle and impelling said stick handle into an awaiting fluid-filled confectionary mold.

6. A dispensing means for use in dispensing a supply of viscous fluid into a mold, said dispensing means comprising:

a supply chamber dimensioned to contain a supply of viscous fluid, said chamber defining a discharge port;

a tubular measuring tube having a first hollow open-ended channel therein, said measuring tube being mounted axially reciprocable in said supply chamber, said measuring tube defining a first port opening and a second port opening, said first port opening communicating with said first channel and said supply chamber, said measuring tube being positionable against said supply chamber wall proximate said discharge port;

a piston-like valve member mounted axially slidable in said measuring tube and extending through said second port, said valve member defining a second hollow channel extending over a length thereof, said valve member having a valve head configured to close said first port opening;

a discharge shaft valve mounted axially slidable within said second channel, said shaft valve being dimensioned and aligned to be sealing inserted into and retracted from said supply chamber discharge port;

actuation means for reciprocating said measuring tube, said piston-like valve member and said shaft valve, whereby said measuring tube may be displaced away from said supply chamber wall permitting a predetermined quantity of fluid to be drawn into said first channel by the vacuum created by a preselected displacement of said piston-like valve member within said measuring tube, said quantity of fluid being thereafter discharged from said measuring tube by abutting said first port opening in a sealed relationship with a portion of said supply chamber wall circumscribing said discharge port, withdrawing said discharge valve shaft to open said discharge port and thereafter effecting a positive active discharge under the force of a displacement of said valve member in said measuring tube.

7. The dispensing means of claim 6 wherein said measuring tube, said piston-like valve member and said discharge shaft valve are detachably mounted within said dispensing means whereby said measuring tube, said piston-like valve member and said shaft valve may be removed from said dispensing means, cleaned and thereafter reinstalled without disturbing any settings and adjustments of said dispensing means.

8. The apparatus of claim 6 with the addition of plural molds and conveyor means for moving said molds beneath said dispensing means.

9. Apparatus for producing confectionary products, said apparatus comprising:

a supply chamber dimensioned to contain a supply of viscous fluid, said chamber defining a discharge port;

a tubular measuring tube having a first hollow open-ended channel therein, said measuring tube being mounted axially reciprocable in said supply chamber, said measuring tube defining a first port opening and a second port opening, said first port opening communicating with said first channel and said supply chamber, said measuring tube being positionable against said supply chamber proximate said discharge port whereby said first port and said discharge port are closed;

a piston-like valve member mounted axially slidable in said measuring tube and extending through said second port, said valve member defining a second hollow channel extending over a length thereof, said valve member having a valve head configured to close said first port opening;

a discharge shaft valve mounted axially slidable within said second channel, said shaft valve being dimensioned and aligned to be sealingly inserted into and retracted from said supply chamber discharge port;

actuation means for reciprocating said measuring tube, said piston-like valve member and said shaft valve, whereby said measuring tube may be displaced away from said supply chamber wall permitting a predetermined quantity of fluid to be drawn into said first channel by the vacuum created by a preselected displacement of said valve member within said measuring tube, said quantity of fluid being thereafter discharged from said measuring tube by abutting said first port opening in a sealed relationship with a portion of said supply chamber wall circumscribing said discharge port and withdrawing said discharge valve shaft to open said discharge port thereafter effecting a positive action discharge under the force engendered by a displacement of said valve member in said measuring tube;

a storage bin dimensioned to retain a plurality of substantially horizontally positioned stick handles, said bin having a floor which is mounted laterally slidable, said bin floor having at least one slot therein aligned parallel with said stick handles in said bin, said slot being dimensioned to receive one of said stick handles;

at least one upright chute positioned below said bin floor, said chute having an open end positioned contiguous said bin floor, said open end dimensioned to receive said bin floor slot retained stick handle from said bin floor slot upon said open end and said slot being brought into alignment;

at least one bar member positioned vertically above said chute open end, said bar member being positioned atop and substantially contiguous said bin floor whereby said bar member precludes stick handles other than said stick handle in said bin floor slot from accessing said chute open end;

an upright curved bank mounted within said chute, said bank having a point of maximum elevation and a point of minimum elevation, said maximum elevational point being positioned substantially directly below a first end of said bin floor slot-retained stick handle and said minimum elevational point being positioned substantially directly below an opposite second end of said bin floor slot retained stick handle;

whereby said bin floor slot retained stick handle, upon falling into said chute, contacts said chute initially proximate said first end whereby a surface of contact between said stick handle and said chute is displaced along a length of said stick handle as said handle continues its descent in said chute, whereby said stick, upon reaching a bottom of said chute, is oriented in a substantially vertical orientation;

a tamper means for impacting against said vertically oriented stick handle and impelling said stick handle into an awaiting, fluid-filled confectionary mold;

at least one first elongate panel having a longitudinal axis defining at least one "V"-shaped slot positioned along one side of said first panel, said "V"-shaped slot having an apex region and being dimensioned to receive a stick portion of a lollipop mold assembly;

at least one second elongate panel positioned parallel and adjacent said first panel, said second pane defining at least one "L"-shaped slot positioned along one side of said second panel to correspond to the positioning of said "V"-shaped slot, said "L"-shaped slot having an elongate inlet channel and a retention channel;

a first drive means associated with said second panel for displacing said second panel along said first panel between two conditions, a first condition wherein an interior region of said "V"-shaped slot is aligned with said inlet channel of said "L"-shaped slot, whereby a stick may be inserted orthogonally into said aligned slots, and a second condition wherein said interior region of said "V"-shaped slot is not aligned with said inlet channel of said "L"-shaped slot, wherein said retention channel of said "L"-shaped slot in association with said interior region of said "V"-shaped slot substantially encircle a stick inserted into said "V"-shaped slot.

10. The apparatus of claim 9 with the addition of plural molds and conveyor means for moving said molds beneath said port.

* * * * *